(12) United States Patent
Ayeb et al.

(10) Patent No.: US 12,700,817 B2
(45) Date of Patent: Aug. 4, 2026

(54) METHOD AND SYSTEM FOR CONTROLLING AN ELECTRIC MACHINE

(71) Applicant: Volkswagen Aktiengesellschaft, Wolfsburg (DE)

(72) Inventors: Mohamed Ayeb, Kassel (DE); Florian Bethke, Kassel (DE); Ludwig Brabetz, Lehre (DE); Thomas Waldmann, Kassel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 233 days.

(21) Appl. No.: 18/649,903

(22) Filed: Apr. 29, 2024

(65) Prior Publication Data

US 2024/0283382 A1    Aug. 22, 2024

Related U.S. Application Data

(63) Continuation of application No. PCT/EP2022/079629, filed on Oct. 24, 2022.

(30) Foreign Application Priority Data

Oct. 29, 2021    (DE) ..................... 10 2021 128 353.1

(51) Int. Cl.
*H02P 21/22*        (2016.01)
*H02P 21/18*        (2016.01)
*H02P 21/30*        (2016.01)

(52) U.S. Cl.
CPC .............. *H02P 21/22* (2016.02); *H02P 21/18* (2016.02); *H02P 21/30* (2016.02); *H02P 2207/05* (2013.01)

(58) Field of Classification Search
CPC .......... H02P 21/22; H02P 21/18; H02P 21/30; H02P 2207/05
See application file for complete search history.

(56) References Cited

U.S. PATENT DOCUMENTS 5,166,593 A      11/1992  De Doncker et al.
5,541,488 A  *   7/1996  Bansal ..................... G01P 3/48
                                                 318/807

(Continued)

FOREIGN PATENT DOCUMENTS

DE        69124694 T2      9/1997
DE        10162170 B4      1/2008

(Continued)

OTHER PUBLICATIONS

International Search Report dated Feb. 27, 2023 in corresponding application PCT/EP2022/079629.

(Continued)

*Primary Examiner* — Thai T Dinh
(74) *Attorney, Agent, or Firm* — Muncy, Geissler, Olds & Lowe, P.C.

(57) ABSTRACT

A method for controlling an electric machine using measurement coils arranged in an air gap situated between a stator and a rotor of the electric machine, a plurality of phase windings assigned to different electrical phases being present. Magnetic linkage fluxes are measured in the air gap via the measurement coils, Magnetic linkage fluxes are determined of the plurality of phase windings of the different phases. The determined magnetic linkage fluxes are transformed into a stator-fixed orthogonal coordinate system in order to obtain orthogonal magnetic linkage fluxes. Phase currents flowing through the plurality of phase windings are measured. The measured phase currents are transformed into the stator-fixed orthogonal coordinate system in order to obtain orthogonal phase currents. An instantaneous torque and/or a flux-forming component of a phase current vector are ascertained. The electric machine is controlled based on the instantaneous torque and/or the flux-forming component.

12 Claims, 6 Drawing Sheets

(56) References Cited

U.S. PATENT DOCUMENTS

| | | | | |
|---|---|---|---|---|
| 6,124,726 | A * | 9/2000 | Dohnal | H01H 9/0005 |
| | | | | 323/341 |
| 6,417,650 | B1 | 7/2002 | Stefanovic et al. | |
| 7,119,512 | B2 * | 10/2006 | Green | H02P 25/089 |
| | | | | 318/717 |
| 8,253,360 | B2 * | 8/2012 | Schulz | H02P 21/04 |
| | | | | 318/811 |
| 9,912,274 | B2 * | 3/2018 | Nakajima | H02P 29/032 |
| 10,658,962 | B2 * | 5/2020 | Goetting | H02P 6/183 |
| 2014/0347046 | A1 | 11/2014 | Bahr et al. | |
| 2015/0002054 | A1 * | 1/2015 | Frankstein | H02P 29/64 |
| | | | | 318/162 |

FOREIGN PATENT DOCUMENTS

| | | | | |
|---|---|---|---|---|
| WO | WO2013079502 | A1 | 6/2013 | |
| WO | WO-2019101688 | A1 * | 5/2019 | H02K 11/225 |

OTHER PUBLICATIONS

Im Jun-Hyuk et al: "Proposing New Planar-Type Search Coil for Permanent Magnet Synchronous Motor: Design and Application for Position Estimation", IEEE Access, IEEE, USA, vol. 9, 16. Sep. 2021 (Sep. 16, 2021), pp. 129078-129087, XP011879830, DOI: 10.1109/ACCESS.2021.3113384.

* cited by examiner

METHOD AND SYSTEM FOR CONTROLLING AN ELECTRIC MACHINE

This nonprovisional application is a continuation of International Application No. PCT/EP2022/079629, which was filed on Oct. 24, 2022, and which claims priority to German Patent Application No. 10 2021 128 353.1, which was filed in Germany on Oct. 29, 2021, and which are both herein incorporated by reference.

BACKGROUND OF THE INVENTION

Field of the Invention

The invention relates to a method and a system for controlling an electric machine using measurement coils arranged in an air gap situated between a stator and a rotor of the electric machine, a plurality of phase windings assigned to different electric phases being present.

Description of the Background Art

In many industrial areas of application and increasingly also in mobile applications ("electromobility"), electric machines are used as drive motors with high efficiency and high specific power and power density.

In many applications, reliable and cost-effective control of the drive motors with regard to speeds and/or torques is required. Control methods are known that take into account a measured rotor position. For this purpose, optical, inductive or Hall-based position sensors are used, which are generally disposed outside the electric machine and measure an angle of rotation of the rotor relative to the stator on the rotor axis.

In order to save the costs of such a position and/or speed sensor, approaches for controlling the electric machine are also known that do not require a position sensor. According to the state of the art, these are based on an estimate of the position of the rotor in relation to the stator using mathematical models of the electric machine and some easily measurable machine variables, such as voltage setpoints and measured phase currents.

For example, the publication WO 2013/079502 A, which corresponds to US 2014/0347046, describes a Hall magnetic field sensor in thin-film technology applied to the surface of a stator pole. The sensor can be used to measure a magnetic flux density in the air gap, which can be used as a control variable for flux-based model-based control.

Typically, however, only the precise knowledge of many machine parameters allows for a sufficiently accurate estimation of the position of the rotor to be able to operate the electric machine reliably and energy-efficiently. Just a production-related fluctuation of the parameters from machine to machine can make a sufficiently accurate estimate of the position of the rotor inadequate for many applications. In addition, many of the parameters included in the mathematical calculation model are subject to the influence of different operating conditions, especially the influence of the operating temperature. The operating condition cannot always be adequately considered in the mathematical calculation model, or the operating condition cannot be measured with sufficient accuracy to be taken into consideration. The latter applies, for example, to the rotor temperature, which can only be accurately determined during operation with a great deal of metrological effort.

The use of a measurement coil in an air gap between the rotor and stator of an electric machine is known from document WO 2019/101688 A1 in order to determine various properties of the electric machine during operation. In the method described, the properties of the electric machine are determined on the one hand by means of a measured impedance of the measurement coil and, on the other hand, on the basis of an induced voltage in the measurement coil. As a result of the measurements, for example, a rotary position and/or a speed of the rotor relative to the stator can be determined. Magnetic fields of permanent magnets in the rotor can also be determined in permanently energized, synchronous or asynchronous machines, which indirectly allow for conclusions to be drawn about temperatures in the rotor. The sizes thus obtained can be used as part of a model-based control procedure for the electric machine. For example, the measurement coil arranged in the air gap can be formed by a foil conductor with printed induction loops. Advantageously, a control procedure can be implemented with a simple and cost-effective sensor. The disadvantage is that a stored calculation model of the electric machine must also be used here, on the basis of which the control variables can be approximated using the measured values. Taking into account, for example, a determined rotor temperature improves the quality of the approximation but does not make it imperative.

SUMMARY OF THE INVENTION

It is therefore an object of the present invention to provide a control method and a control system based on the results of measured values of a measuring sensor within the air gap between the rotor and stator of an electric machine and on using control variables which are directly and specifically determined and not just approximately. It is a further object to describe a system with an electric machine and such a control.

A method according to the invention of the type mentioned above comprises the following steps: measuring magnetic linkage fluxes in the air gap with the aid of the measurement coils and determining magnetic linkage fluxes of the plurality of phase windings of the different phases. The magnetic linkage fluxes determined in this way are transformed into a stator-fixed orthogonal coordinate system to obtain orthogonal magnetic linkage fluxes. In addition, phase currents flowing through the plurality of phase windings are measured and transformed into the stator-fixed orthogonal coordinate system in order to obtain orthogonal phase currents. This ascertains instantaneous torque and/or a flux-forming component and the electric machine is controlled based on the instantaneous torque and/or the flux-forming component.

The two components of the current vector, the flux-forming component and the torque-forming component (and thus the current torque), can be determined by this method without further approximations with the aid of the measurement coils in the air gap and the measurements of the phase currents. In the method according to the invention, the magnetic linkage fluxes of the plurality of phase windings of the different phases are determined from the measured values of the plurality of the measurement coils, preferably by taking into account a previously known winding scheme of the phase windings around the stator teeth.

By directly determining these variables, the electric machine can be controlled without a position sensor measuring the rotor position and without these variables being estimated using models and possibly being inaccurate.

The instantaneous torque can be measured by means of the cross product of the orthogonal magnetic linkage fluxes and the orthogonal phase currents. For the control, the instantaneous torque can be compared with a predetermined setpoint of the torque.

The flux-forming component of the phase current vector can be determined by projecting the phase current vector onto a linkage flux vector formed from the orthogonal magnetic linkage fluxes. For the control, the flux-forming component of the phase current vector can be compared with a setpoint for this component, which is determined on the basis of the setpoint of the torque, for example with the aid of a predetermined table.

The control can be designed as a field-oriented control or as direct torque control. These two methods are—with other determination of the control variables—generally known, which means that established control loops can be advantageously used. In addition, a rotor position and/or a rotor speed can be determined from the orthogonal magnetic linkage fluxes.

A plurality of measurement coils can be used, each of which is arranged on a stator tooth of the stator. Preferably, the measurement coils can be planar coils that are applied to foils. Such measurement coils can be manufactured so thinly that they can be used in electric machines with typical air gap widths.

The measured phase currents and/or magnetic linkage fluxes compared with expected values and/or with previously determined values for diagnostic purposes. In this way, during the execution of the control procedure, an additional diagnosis of the electric machine or its control can be carried out. The magnitude of the magnetic linkage fluxes results from the interaction of the power supply to the stator windings and the magnetization of the rotor. If there are differences between the values or differences compared to earlier measurements, this may indicate errors in the measurement of the currents and/or changes in the rotor magnetization, e.g., demagnetization. Asymmetries with regard to the different phases can also indicate errors, e.g., possible winding faults or cable breaks.

An inventive system for controlling an electric machine using measurement coils arranged in an air gap between a stator and a rotor of the electric machine can have an evaluation unit for evaluating measured values of the measurement coils and a control that is connected to the evaluation unit with actual value inputs. The system is characterized by the fact that the evaluation unit and the control are set up to carry out the previously mentioned method. This results in the advantages mentioned in connection with the method.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figures 1A, 1B:
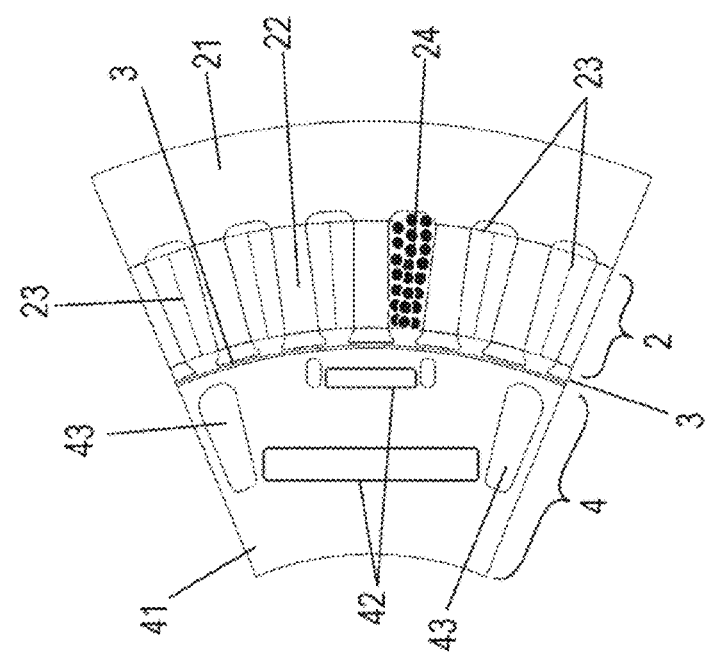
FIG. 1a shows a schematic diagram of the principle of an electric machine.
FIG. 1b shows a more detailed schematic diagram of a pole pitch of the electric machine shown in FIG. 1.

FIGS. 1a, b and 2a, b first show an electric machine 1 which can be controlled by the control method according to the invention.

FIG. 1a shows the electric machine 1 in cross-section in a very schematic representation. The electric machine 1 has a stator 2, which is roughly hollow-cylindrical. Inside the stator 2 there is a rotatable rotor 4, wherein there is a circumferential air gap 3 between the stator 2 and the rotor 4. In the example shown here, the electric machine 1 is designed as an internal rotor—the stator 2 is stationary and lies outside, while the rotor 4 is rotatably mounted inside the stator 2. The control method presented in this application may also be used for an external rotor machine in which the stator is fixed on the inside and the rotor is located on the outside in the form of a hollow cylinder and rotates around the stator.

During operation, a rotation of the rotor 4 in relation to the stator 2 is achieved by a magnetic interaction between a magnetic rotor field and a magnetic stator field. In the air gap 3, rotor and stator field overlap, whereby torque is built up on the rotor 4 in relation to the stator 2. Stray fields in the rotor 4 or stator 2 which do not close across the air gap 3 and the other component, i.e., stator 2 and rotor 4, do not contribute to the formation of torque.

The control method described below is suitable for an electric machine 1 designed as a three-phase machine, such as an asynchronous machine or a synchronous machine.

FIG. 1a shows a segment of the electric machine 1, which is known as pole pitch 5. This pole pitch 5 is shown in more detail in FIG. 1b.

FIG. 1b shows that stator 2 comprises a stator yoke 21 and has a plurality of radially inward-facing stator teeth 22, between which there are corresponding grooves 23. In these grooves 23, stator windings 24 are arranged, which generate the stator magnetic field. By way of example and for the sake of clarity, a stator winding 24 is indicated in FIG. 1b in only one of the grooves 23.

The rotor 4 has a rotor yoke 41 in which permanent magnets 42 are embedded. In the radial direction, the permanent magnets 42 are surrounded by cavities 43 in the rotor yoke 41.

The electric machine 1 shown is a permanent-magnet synchronous machine with embedded magnets. This is purely exemplary. It should be noted that the application procedure also applies to other types of three-phase machines, such as synchronous machines with external excitation, synchronous machines with embedded magnets and surface machines reluctance machines and asynchronous machines.

In the case of three-phase machines, three stator windings 24 interconnected in a star or triangular circuit are usually used, which are arranged in the grooves 23 over the circumference of the stator 2. Each of the three windings, also known as phase windings, can comprise several coils. The three phase windings are azimuthally offset from each other, although they may partially overlap. With the help of the phase windings, magnetic poles are formed along the circumference of the stator 2, specifically at least one pair of poles, usually several pairs of poles. The azimuthal extension of half a pair of poles corresponds exactly to the pole pitch 5 indicated in FIG. 1*a* and reproduced in FIG. 1*b*.

Figure 2B:
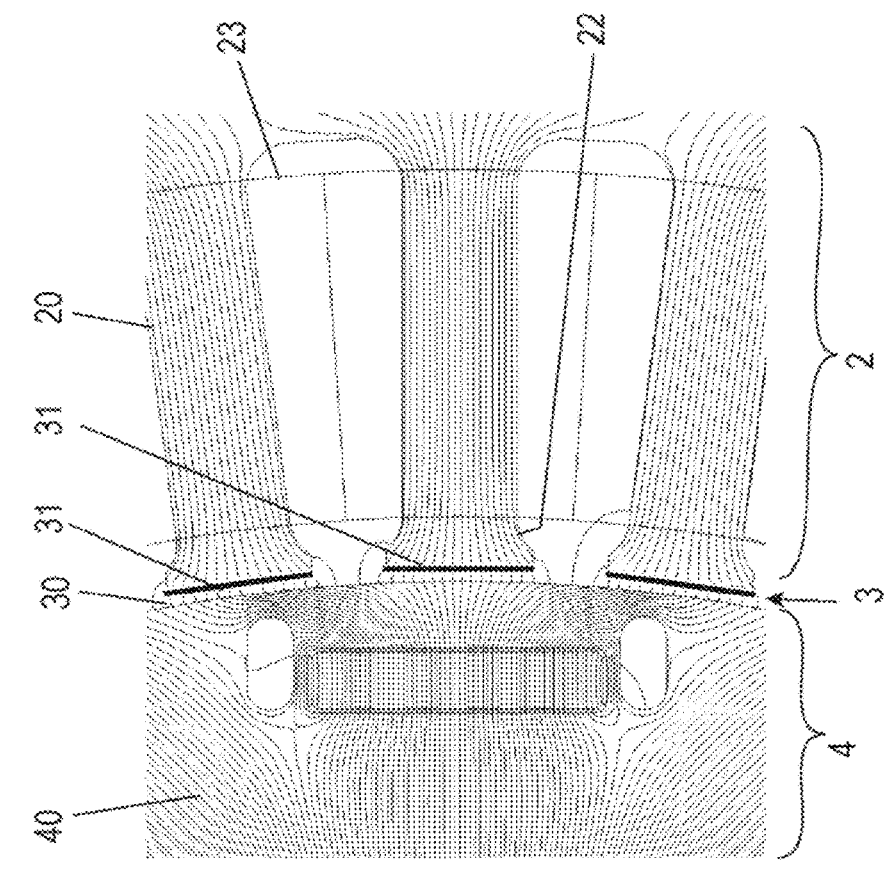
FIG. 2b shows an excerpt from FIG. 2a with a more detailed representation of the field lines.
Figure 2A:
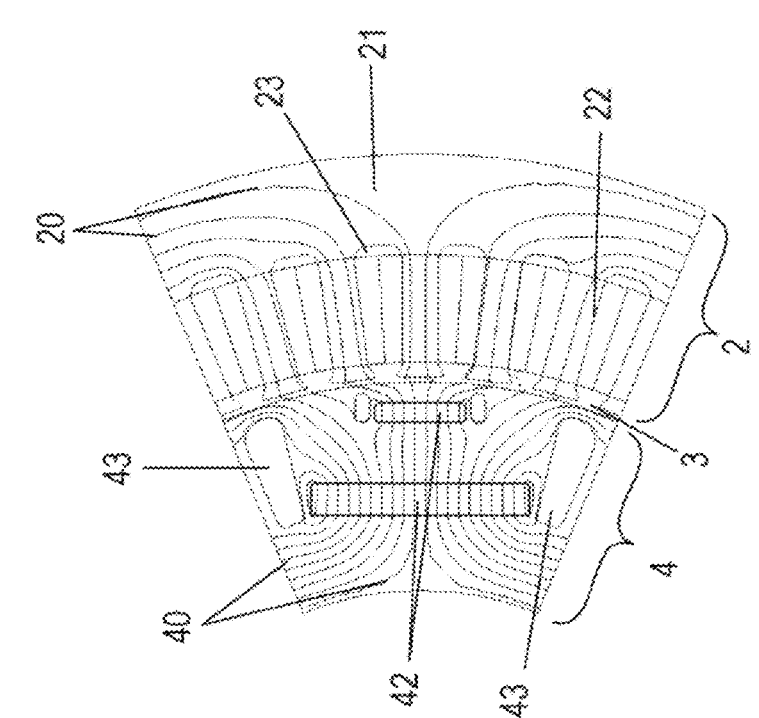
FIG. 2a shows the pole pitch according to FIG. 1b in a representation with magnetic field lines.

In FIG. 2*a*, the pole pitch 5 in FIG. 1*b* is shown in a representation with magnetic field lines in the operation of the electric machine 1. The stator field lines 20 in the stator 2 and the rotor field lines 40 in the rotor 4 can be seen.

FIG. 2*b* shows a section of FIG. 2*a* in the area of three stator teeth 22. In this diagram, the stator field lines 20 and the rotor field lines 40 are illustrated in greater density and in more detail. The figure shows well the bundling of the rotor field lines 40 by the permanent magnet 42 and the routing of the rotor field lines 40 around the cavities 43. The guidance of the stator field lines 20 by the stator teeth 22 can also be seen.

In FIG. 2*b*, the course of the magnetic field lines can also be seen in the air gap 3, represented by air gap field lines 30.

FIG. 2*b* also shows planar measurement coils 31 arranged on the stator teeth 22, specifically on their tooth flanks. In the axial direction, the measurement coils 31 preferably extend over the entire length of the stator tooth 22. As shown by the air gap field lines 30 in the air gap 3, the measurement coils 31 detect essentially all, or at least all torque-relevant magnetic fields.

Figure 3:
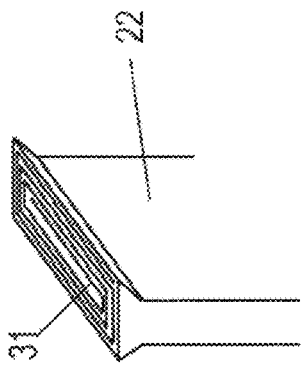
FIG. 3 shows an oblique view of a stator tooth with a measurement coil.

In FIG. 3, a stator tooth 22 is shown separately in a schematic representation to illustrate the arrangement of the measurement coil 31 on the tooth flank of the stator tooth 22. The measurement coil 31 is formed as a so-called "radial coil", i.e., a coil with several windings that lie within one plane. Preferably, the measurement coil 31 has a thin (plastic) film as the carrier material, on which conductor loops forming the coil are vaporized. The measurement coil 31 can therefore make use of the technology and the established manufacturing processes of flexible printed circuit boards (FPC).

In the example shown, a single coil is formed, which essentially extends over the entire surface of the tooth flank of the stator tooth 22. In an example, it is possible to provide several separately contactable coils in the axial direction along the tooth flank. This is of interest when the rotor 4 of the electric machine is embodied as a so-called "segmented rotor" comprising several rotor segments arranged one behind the other in the axial direction and rotated by a certain angular amount.

Figure 4:
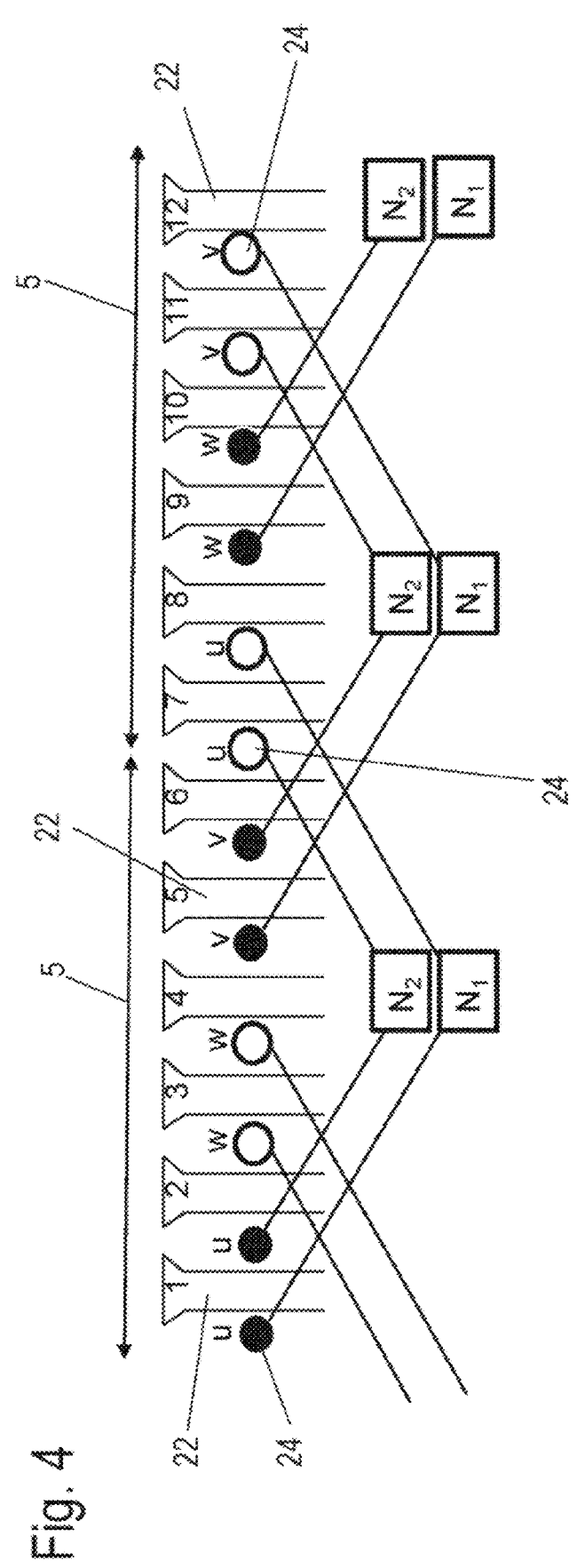
FIG. 4 shows a schematic representation of a winding scheme of an electric machine.

In a schematic diagram, FIG. 4 illustrates a winding scheme of the electric machine 1 shown above. It should be noted that the winding scheme presented is purely exemplary and serves to derive and explain the method according to the application. The correlations shown below can be applied to any other winding schemes, e.g., even those that have multilayer or chorded windings. Purely by way of example, the stator 2 of the electric machine 1 shown in FIG. 4 has exactly one pair of poles with twelve stator teeth.

However, the method according to the application described below can also be applied analogously to electric machines with several pairs of poles.

FIG. 4 illustrates the twelve stator teeth 22 with stator windings 24. For the sake of simplicity, the stator 2 of the electric machine 1 is shown unwound so that stator teeth 22 are shown linearly along a line.

The twelve stator teeth 22 are assigned to the mentioned one pair of poles and thus two pole pitches 5. As mentioned earlier, the electric machine 1 is a three-phase machine, operated on three electric phases u, v and w. Accordingly, it has three phase windings 24. For the purposes of this application, the designation of the phases u, v, w, shall be used as an index to identify the three phase windings 24 and all the parameters measured or calculated depending on the respective phase windings 24 or the respective electric phase u, v, w.

In the example shown in FIG. 4, the phase windings 24 of the three phases u, v, w each formed of two concentric coils with coil numbers $N_1$ and $N_2$ respectively. The stator windings 24, each belonging to a coil, are connected in FIG. 4 with a box designated as $N_1$ or $N_2$ in order to indicate the affiliation of the corresponding stator windings 24 (shown cut) to each other. Furthermore, in FIG. 4, the stator teeth 22 of the pole pairing of 1-12 are numbered consecutively, wherein the numbering is subsequently used to identify the stator teeth 22. Due to the linearly unwound representation of the stator 2, the links starting from the phase windings 24 of the phase w shown on the left in FIG. 4 with the boxes indicated on the right in FIG. 4 should be connected mentally with the numbers of windings $N_1$ or $N_2$.

An outer phase coil u thus comprises the stator teeth 22 with the index 1-7 and an inner phase coil u comprises the stator teeth 22 with the index 2-6. The phase coils v and w are each offset by four teeth, which corresponds to one third of the number of teeth of a pair of poles. The phase coils w are in turn offset by four teeth in relation to the phase v (their forward conductors are located in grooves 9 and 10 and the return conductors in grooves 3 and 4). They are formed by windings of adjoining pairs of poles, not shown in FIG. 4, when the machine has several pairs of poles.

On each of the twelve stator teeth 22 there is a measurement coil 31, not shown in FIG. 4, each of which can be used to measure a magnetic linkage flux $\psi$. The individual, measured linkage fluxes $\psi$, which are measured on the respective stator tooth 22, are subsequently referred to as $\psi_1$-$\psi_2$ on the basis of the index of the stator tooth 22.

On the basis of the measured values of the linkage fluxes $\psi_1$-$\psi_{12}$, magnetic linkage fluxes $\psi_u$, $\psi_v$ and $\psi_w$ assigned to the phase coils or phases u, v, w, can be determined as follows, taking into account the number of winding numbers $N_1$ and $N_2$ (equations 1):

$$\Psi_u = k[N_1(\Psi_1 + \Psi_2 + \Psi_3 + \Psi_4 + \Psi_5 + \Psi_6 + \Psi_7) + N_2(\Psi_2 + \Psi_3 + \Psi_4 + \Psi_5 + \Psi_6)]$$

$$\Psi_v =$$
$$k[N_1(\Psi_5 + \Psi_6 + \Psi_7 + \Psi_8 + \Psi_9 + \Psi_{10} + \Psi_{11}) + N_2(\Psi_6 + \Psi_7 + \Psi_8 + \Psi_9 + \Psi_{10})]$$

$$\Psi_w =$$
$$k[N_1(\Psi_9 + \Psi_{10} + \Psi_{11} + \Psi_{12} + \Psi_1 + \Psi_2 + \Psi_3) + N_2(\Psi_{10} + \Psi_{11} + \Psi_{12} + \Psi_1 + \Psi_2)]$$

In this case, the factor k gives the ratio of the linkage flux $\psi_1$-$\psi_{12}$ to the (actual) magnetic flux in the respective stator tooth 22. The factor k depends on the geometry of the measurement coil 31 at the stator tooth 22, e.g., on the number of windings and the corresponding area. It can be determined, for example, in an idle test with non-energized stator windings 24, by comparing induced voltages at connections of the electric machine 1 with calculated voltages according to the formulas given above, wherein induced voltages are used in the formulas instead of magnetic fluxes.

For the subsequent processing of the information obtained, it is useful to transform the three linkage fluxes $\psi_u$, $\psi_v$ and $\psi_w$ according to the equations 1 into orthogonal components with the index a, b. For example, the Clarke transform (equations 2) can be used for this purpose:

$$\Psi_a = 2/3 \left( \Psi u + \Psi_v \cos(2/3\ \pi) + \Psi_w \cos(4/3\ \pi) \right)$$
$$\Psi_b = 2/3 \left( \Psi_v \sin(2/3\ \pi) + \Psi_w \sin(4/3\ \pi) \right)$$

In addition to the magnetic fluxes, the currents through the phase windings of the phases u, v, w, are also measured as $I_u$, $I_v$, $I_w$ and transferred to the same orthogonal components a, b (equations 3):

$$I_a = 2/3 \left( I_u + Iv \cos(2/3\ \pi) + I_w \cos(4/3\ \pi) \right)$$
$$I_b = 2/3 \left( I_v \sin(2/3\ \pi) + I_w \sin(4/3\ \pi) \right)$$

The now orthogonally interconnected magnetic flux linkages $\psi_a$, $\psi_b$ and the corresponding phase currents $I_a$, $I_b$ can be used to determine an actual, instantaneous torque $M_{ist}$ of the electric machine via the cross product:

$$M_{ist} = 3/2\ p\ (\Psi_a \times I_b - \Psi_b \times I_a)$$

wherein p indicates the number of pole pairs of the electric machine 1.

It is noted that the magnetic flux linkages $\psi_a$, $\psi_b$ thus determined, which are hereinafter referred to as "stator fluxes" for the sake of simplicity, only represent one main flux of the stator 2. A stray flux fraction is not determined because the measured magnetic fields do not detect stray flows with the measuring sensors 31. However, since the stray flux fraction does not contribute to the torque, it can be neglected for the control purposes explained below. It is noted that for other purposes, e.g., to calculate a terminal voltage on the electric machine 1 in motorized or generator operation, the contribution of the stray flux fraction would have to be taken into account. A distinction must be made between this and idle operation, in which there are no stator stray fluxes without stator current, which is why the above-mentioned method for identifying k can be carried out.

The instantaneous torque manure determined in this way can be used in a control method as a control variable for the electric machine 1 and, for example, currents can be controlled in such a way that a predetermined torque $M_{soll}$ is achieved.

In the example of FIG. 4, each of the twelve stator teeth 22 shown is equipped with a measurement coil 31. However, it is not necessary to equip every stator tooth 22 of the electric machine 1 with a measurement coil 31 since the symmetrical structure of the electric machine 1 allows for the magnetic field in the air gap 3 to be reconstructed over the entire circumference of the stator 2 using measurements on some selected stator teeth 22. Assuming a symmetrical design of the electric machine 1 and a sinusoidal course of the rotating field in the air gap 3, the number of measurement coils 31 required can be reduced to two, which are then be fastened to two stator teeth 22 offset by half a pole pitch 5.

Figure 5:
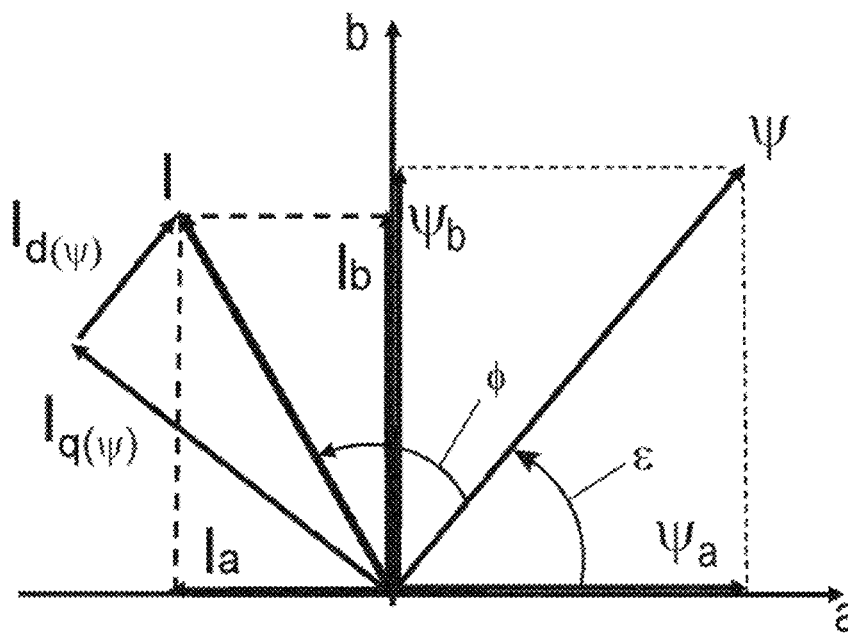
FIG. 5 shows a representation of a flux linkage and phase currents of an electric machine.

FIG. 5 shows the components of the stator flux $\psi_a$, $\psi_b$ and of the phase fluxes $I_a$, $I_b$ as examples of a snapshot across the axes a, b. The axes a and b form a stator-fixed coordinate system in which resulting vectors $\psi=(\psi_a, \psi_b)$ and $I=(I_a, I_b)$ rotate when the rotor of the electric machine rotates. The current position of the vector of the stator flux $\psi$ is given as angular position ε relative to the coordinate axis a. As compared to the stator-fixed coordinate system (i.e., with respect to the axes a, b in FIG. 5), the resulting vectors of the stator flux $\psi$ and of the phase current I exhibit different phase positions, which are indicated at an angle $\phi$ between the vector of the phase current I and the vector of the stator flux $\psi$.

FIG. 5 further shows the projection of the vector of the phase current I onto the vector of the stator flux $\psi$, in other words, the vector of the phase current I is divided into a parallel component to the vector of the stator flux $\psi$ and a component perpendicular to it. The parallel component is given the abbreviation $I_d$ ($\psi$) and the perpendicular component, the abbreviation $I_q$ ($\psi$). Since only the perpendicular component $I_q$ ($\psi$) results in a torque, it is hereinafter also referred to as the "torque-forming component $I_q$ ($\psi$)" The component $I_d$ ($\psi$) aligned parallel to the direction of the stator flux vector $\psi$ represents a flux-forming component of the current vector I.

The two components of the power vector I, the flux-forming component $I_d$ ($\psi$) and the torque-generating component $I_q$ ($\psi$) can thus be determined in the method described above, without further approximations, by means of measurement coils 31 on the stator teeth 22 as well as a measurement of the phase fluxes $I_u$, $I_v$, $I_w$.

These variables are also control variables in known control methods for electric machines. Accordingly, the method of direct determination of these variables described above permits the electric machine to be controlled without the need to determine these variables from a rotor position measured by a position sensor or without the inadequacy of determining these variables using model-based estimates.

Figure 6:
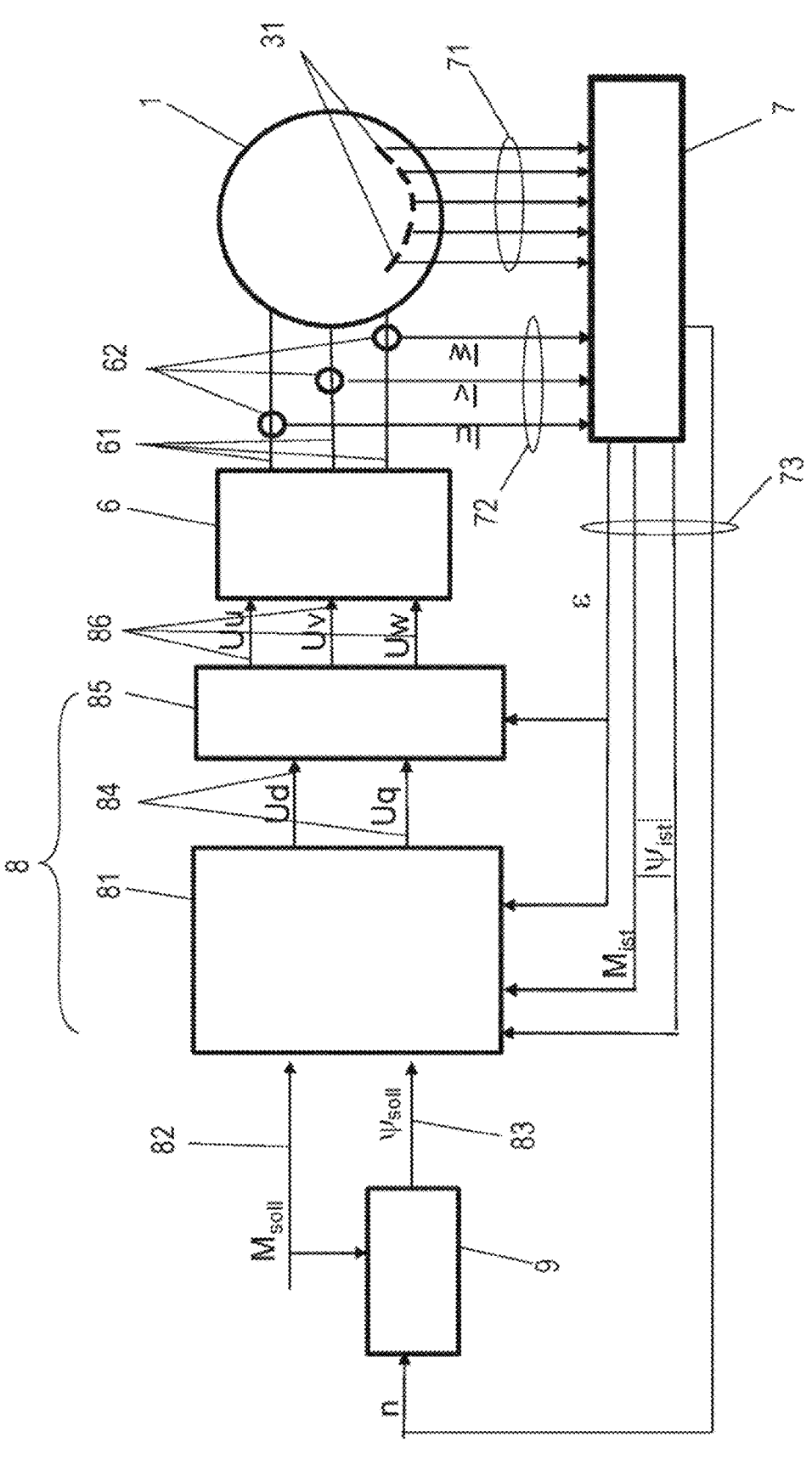
FIG. 6 shows an electric machine with a control system for performing field-oriented control in a block diagram.

In a schematic block diagram, FIG. 6 shows an arrangement for the control of an electric machine 1 using direct measurement of torque M and stator flux $\psi$.

The arrangement comprises an inverter 6 with phase current outputs 61 via which the stator windings 24 of the electric machine 1 are energized. Phase current sensors 62 are downstream of the phase current outputs 61, which acquire (time-dependent) measured values for the phase currents $I_u$, $I_v$, $I_w$.

Furthermore, there is an evaluation unit 7 in which the previously described method for determining the stator flux vector $\psi$, the torque M and also a speed n is performed. The evaluation unit 7 comprises inputs 71 for the measurement coils 31 and inputs 72 for the phase currents $I_u$, $I_v$, $I_w$. At outputs 73, an instantaneous (current) torque $M_{ist}$ and the speed n are output, as well as an instantaneous stator flux vector $\psi_{ist}$, in the present case as an absolute value $|\psi_{ist}|$ as well as its angular position ε.

These values are fed into a control arrangement 8, which includes the actual control 81 and a coordinate transformer 85. In the control 81, the supplied actual values of the torque $M_{ist}$ and stator flux $|\psi_{ist}|$ are compared to corresponding setpoints of the torque $M_{soll}$ and $\psi_{soll}$, which are fed at setpoint inputs 82, 83. Usually, the torque setpoint value $M_{soll}$ is supplied directly and represents the control specification for the electric machine 1. The setpoint value for the stator flux $\psi_{soll}$ is calculated using a preset unit 9 from the torque setpoint value $M_{soll}$ and the speed n, wherein the preset unit 9 comprises a desired speed-dependent relationship between the torque-setpoint value $M_{soll}$ and the stator flux setpoint value $\psi_{soll}$ in a predefined and stored characteristic field.

At control outputs 84, the control 81 outputs voltages $U_d$, $U_q$ as control variables for the phase windings of the electric machine. At the control outputs 84, these voltages are output in the d/q coordinate system and transformed in the coordinate transformer 85 into the actual specifications for phase voltages $U_u$, $U_v$, $U_w$ for the inverter 6, which are provided for these at phase control outputs 86.

FIG. 6 thus shows a field-oriented control for the electric machine 1 on the basis of a direct measurement of the control variables.

Figure 7:
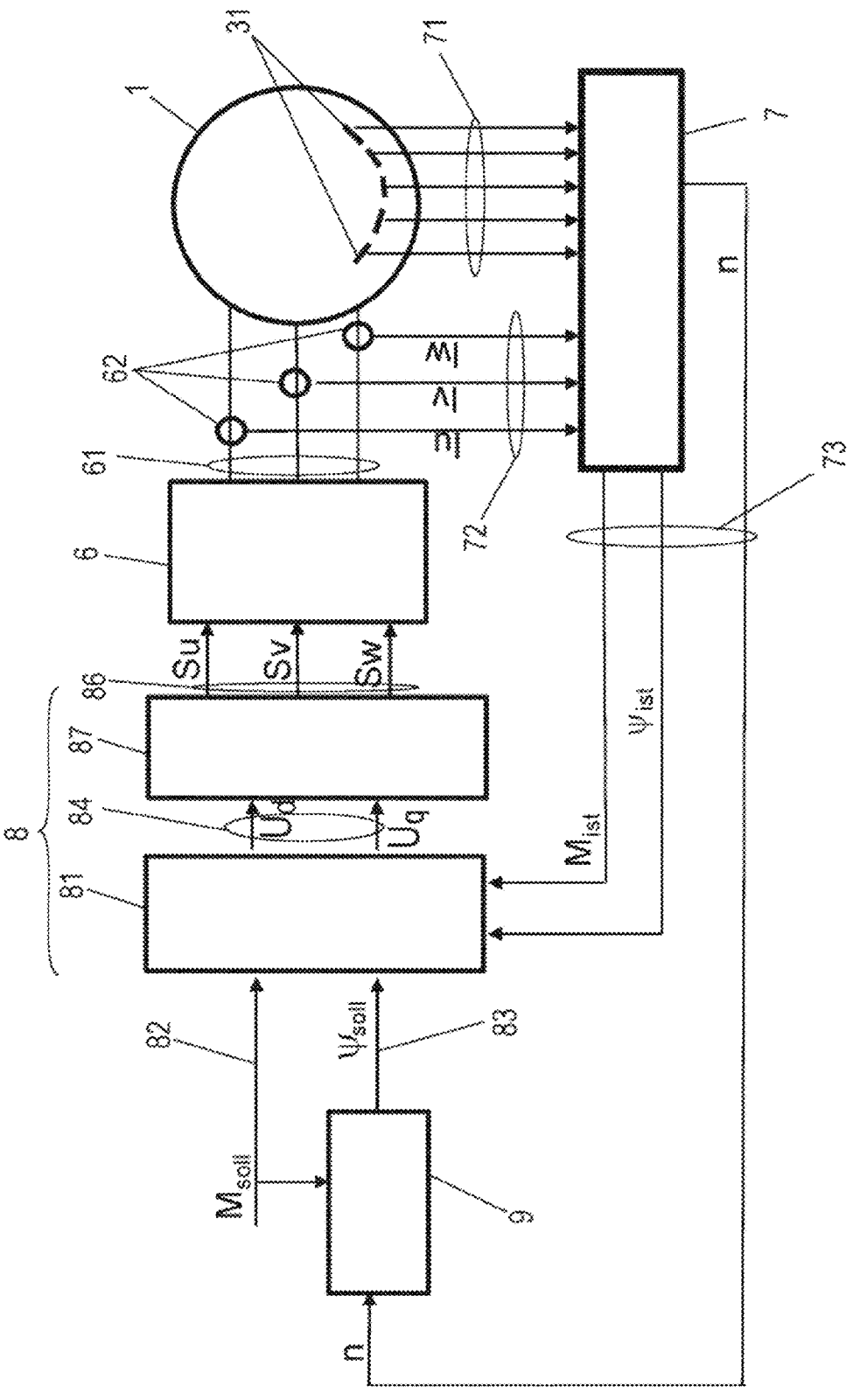
FIG. 7 shows an electric machine with a control system for performing field-oriented control in a block diagram for direct torque control.

FIG. 7 shows a modification of this field-oriented control, the control principle of which is known as DTC—Direct Torque Control. In this figure, identical reference signs indicate elements that are the same or identical to those in FIG. 6.

In contrast to the example in FIG. 6, the inverter 6 is not controlled by specifications for the phase voltages $U_u$, $U_v$, $U_w$ for the phase windings 24, but via switching states $S_u$, $S_v$, $S_w$, that directly control switching operations, which control the phase windings 24 in a pulse-width modulation method. For this purpose, instead of the coordinate transformer 85, a switching table 87 is provided, with a selection of the switching states $S_u$, $S_v$, $S_w$ taking place on the basis of the control output 84 of the control 81.

Here, too, it is relevant that the actual value of the torque $M_{ist}$ and the actual value of the stator flux '$\psi_{ist}$' are determined directly from the measured values of the measuring sensors 31 as well as the measured phase currents $I_u$, $I_v$, $I_w$. An estimation of these values or taking into account other machine parameters that could change during operation is not required.

What is claimed is:

1. A method for controlling an electric machine using measurement coils arranged in an air gap situated between a stator and a rotor of the electric machine, a plurality of phase windings assigned to different electric phases being present, the method comprising:

measuring magnetic linkage fluxes in the air gap via the measurement coils;

determining magnetic linkage fluxes of the plurality of phase windings of the different phases;

transforming the determined magnetic linkage fluxes of the plurality of phase windings into a stator-fixed orthogonal coordinate system in order to obtain orthogonal magnetic linkage fluxes;

measuring phase currents flowing through the plurality of phase windings;

transforming the measured phase currents into the stator fixed orthogonal coordinate system in order to obtain orthogonal phase currents;

ascertaining, from the orthogonal magnetic linkage fluxes and the orthogonal phase currents, an instantaneous torque, and/or ascertaining, from the orthogonal magnetic linkage fluxes and the orthogonal phase currents, a flux-forming component of a phase current vector formed from the orthogonal phase currents; and controlling the electric machine based on the instantaneous torque and/or the flux-forming component thus determined, wherein each of the measurement coils is arranged on a tooth face of a stator tooth of the stator, the tooth face facing the air gap, and wherein the measurement coils are planar coils applied to foil.

2. The method according to claim 1, wherein the instantaneous torque is ascertained by a cross product of the orthogonal magnetic linkage fluxes and the orthogonal phase currents.

3. The method according to claim 1, wherein the instantaneous torque is compared with a predetermined torque setpoint.

4. The method according to claim 3, wherein the flux-forming component of the phase current vector is determined by a projection of the phase current vector onto a linkage flux vector formed from the orthogonal magnetic linkage fluxes.

5. The method according to claim 4, wherein the flux-forming component of the phase current vector is compared with a component setpoint, the component setpoint being determined by the torque setpoint.

6. The method according to claim 5, wherein the component setpoint is determined using a predetermined table based on the torque setpoint.

7. The method according to claim 1, wherein the control is designed as a field-oriented control.

8. The method according to claim 1, wherein the control is designed as direct torque control.

9. The method according to claim 1, wherein a rotor position and/or a rotor speed is determined from the orthogonal magnetic linkage fluxes.

10. The method according to claim 1, wherein the magnetic linkage fluxes of the plurality of phase windings of the different phases are determined from measured values of the measurement coils by taking into account a previously known winding scheme of the phase windings around the stator teeth.

11. The method according to claim 1, wherein the measured phase currents and/or the magnetic linkage fluxes of the plurality of phase windings of the different phases are compared with each other, with expected values and/or with previously determined values for diagnostic purposes.

12. A system for controlling an electric machine with the aid of measurement coils arranged in an air gap situated between a stator and a rotor of the electric machine, the system comprising:

an evaluator to evaluate measured values of the measurement coils; and a control connected to the evaluator with actual value inputs, wherein the evaluator and the control are configured to carry out the method according to claim 1.

* * * * *